US008678057B2

(12) United States Patent
Seonggon

(10) Patent No.: US 8,678,057 B2
(45) Date of Patent: *Mar. 25, 2014

(54) LABEL APPLICATOR

(75) Inventor: Son Seonggon, Seoul (KR)

(73) Assignee: Sato Holdings Kabushiki Kaisha (JP)

( * ) Notice: Subject to any disclaimer, the term of this patent is extended or adjusted under 35 U.S.C. 154(b) by 287 days.

This patent is subject to a terminal disclaimer.

(21) Appl. No.: 13/141,215

(22) PCT Filed: Jan. 19, 2009

(86) PCT No.: PCT/JP2009/050676
§ 371 (c)(1),
(2), (4) Date: Jun. 21, 2011

(87) PCT Pub. No.: WO2010/073741
PCT Pub. Date: Jul. 1, 2010

(65) Prior Publication Data

US 2011/0290424 A1 Dec. 1, 2011

(30) Foreign Application Priority Data

Dec. 25, 2008 (JP) ................................ 2008-330619

(51) Int. Cl.
*B32B 41/00* (2006.01)

(52) U.S. Cl.
USPC ........... 156/360; 156/361; 156/367; 156/368; 156/442.1; 156/443; 156/522

(58) Field of Classification Search
USPC .............. 156/360, 361, 367, 368, 442.1, 443, 156/522
See application file for complete search history.

(56) References Cited

U.S. PATENT DOCUMENTS 7,703,685 B2 * 4/2010 Horn et al. .................... 235/486
7,969,309 B2 * 6/2011 Abe et al. .................. 340/572.1
(Continued)

FOREIGN PATENT DOCUMENTS

JP 2008-535741 A 9/2004
JP 2007-119022 5/2007
(Continued)

OTHER PUBLICATIONS

International Search Report dated Apr. 28, 2009, issued in corresponding PCT Application No. PCT/JP2009/050676.

*Primary Examiner* — George Koch
(74) *Attorney, Agent, or Firm* — Ostrolenk Faber LLP

(57) ABSTRACT

A labeling applicator having a suction plate (21) including a pair of divided bodies (21*b*, 21*c*) movable relatively to two positions, i.e., a contact position (S) where the opposing end faces facing each other move toward contact while sucking a first surface side of a label (L) to which an RFID tag is attached and a separated position (V) where the opposing end faces are separated from each other, wherein a portion (2) of the label (L) is folded in a peak by the end faces of the divided bodies (21*b*, 21*c*) facing each other as a divided body (21*c*) moves, thus forming a folded portion (M) having a bend or curved position (7) on the proximal end, before labeling an article (W). A non-abutting portion (20) is provided by cutting the edge of each split body (21*b*, 21*c*) corresponding to the bend (7) on the proximal end of the folded portion (M) such that the end faces of the divided bodies (21*b*, 21*c*) do not abut when the end faces move toward contact. Since a gap (Q) is formed between the bends (7) of the folded portion (M) in a label (L) attached by the labeling device, the folded portion (M) of the label (L) does not tilt easily enabling stabilized read/write of data.

9 Claims, 12 Drawing Sheets

(56) References Cited

U.S. PATENT DOCUMENTS

| | | | | |
|---|---|---|---|---|
| 8,020,598 | B2 * | 9/2011 | Kirita et al. | 156/360 |
| 8,151,850 | B2 * | 4/2012 | Murakami | 156/361 |
| 2006/0226214 | A1 * | 10/2006 | Horn et al. | 235/375 |
| 2008/0303666 | A1 * | 12/2008 | Abe et al. | 340/572.1 |
| 2010/0139866 | A1 * | 6/2010 | Kirita et al. | 156/378 |
| 2010/0206486 | A1 * | 8/2010 | Murakami | 156/361 |
| 2010/0247871 | A1 * | 9/2010 | Barczyk et al. | 428/174 |

FOREIGN PATENT DOCUMENTS

| | | |
|---|---|---|
| JP | 2008-273569 | 11/2008 |
| WO | WO 2006/110174 A2 | 10/2006 |
| WO | WO 2008/136209 A1 | 11/2008 |

* cited by examiner

LABEL APPLICATOR

TECHNICAL FIELD

The present application is a 35 U.S.C. §§371 national phase conversion of PCT/JP2009/050676, filed Jan. 19, 2009, which claims priority of Japanese Application No. 2008-330619, filed Dec. 25, 2008, the contents of which are incorporated by reference herein. The PCT International Application was published in the Japanese language.

The present invention relates to a label applicator capable of applying a label provided with a so-called RFID tag having an IC chip that records various information therein to an item.

BACKGROUND ART

A widely used technique typically performs automatic identification wirelessly and in a noncontact manner using RFID (Radio Frequency IDentification) tags provided for labels applied to various goods. Each tag has an IC chip that records various information therein and a communication antenna that is connected to the IC chip.

As shown in FIG. 7, as an example of such label applicators capable of applying a label L provided with an RFID tag T to an item, there is conventionally known a technique that has been proposed by the Applicant (Japanese Unexamined Patent Application Publication (Translation of PCT) No. 2008-535741, corresponding to U.S. Pat. No. 7,703,685 (B2)).

This label applicator applies the label L to an item W by forming a flexed portion M by folding a section 2 of the label L including a tag providing portion 1 at which the RFID tag T is provided so as to project into an angled shape with a back surface facing inside and a front surface facing outside. The flexed portion M is provided with one side surface 3 and another side surface 4 and having curved portions 7 on a base end side with a peak portion 6 as a border between the one side surface 3 and the other side surface 4.

The label applicator is provided with a suction-holding plate 100 that applies suction to and holds the front surface of the label L. The plate includes a pair of divided bodies 100*a* and 100*b*. The divided bodies 100*a* and 100*b* move relative to each other between two positions: a contact position S at which end surfaces of the divided bodies 100*a* and 100*b* that face toward each other are brought into contact, and a separated position V (broken line in FIG. 7) at which the end surfaces are positioned apart from each other. First, the label L is suctioned and held in a state in which the divided bodies 100*a* and 100*b* of the suction-holding plate 100 are positioned at the contact position S. Next, the divided bodies 100*a* and 100*b* of the suction-holding plate 100 are moved to the separated position V in a state while the label L is being suctioned and held. Then, the divided bodies 100*a* and 100*b* of the suction-holding plate 100 are moved back to the contact position S to produce the flexed portion M by folding of the section 2 of the label L into the angled shape with the back surface facing inside. The suction-holding plate 100 is moved while in this state, so that the label L is applied to the item W.

In the label L applied using the conventional label applicator, the flexed portion M of the label is provided upright, such that the entire back surfaces of the one side surface 3 and the other side surface 4 of the section 2 of the label L that constitute the flexed portion M are adhered. They often fall flat at the curved portions 7 depending on their environment in transportation or in a storage area of an item on which the label has been applied. A problem with leaving the label fallen flat is that often reduces capabilities of wireless reading and writing between the RFID tag T and a reader/writer.

SUMMARY OF INVENTION

Technical Problem

The present invention is made in view of the above problem. An object of the present invention is to provide a label applicator capable of preventing as much as possible a flexed portion of a label provided with an RFID tag from falling flat, thereby ensuring reading and writing of data in a stable manner.

Solution To Problem

In order to solve the above problem, a label applicator according to the present invention applies a label provided with an RFID tag having an IC chip and communication antenna to an item. The application is carried out by folding a section of the label, including a tag providing portion at which the RFID tag is provided, so as to project into an angled shape with a back surface facing inside and a front surface facing outside, thereby forming a flexed portion including one side surface and the other side surface. Each side surface has a curved portion on a base end side, taking a peak portion as a border between the one side surface and the other side surface The applicator is provided with: a suction-holding plate configured to suction and hold the label from a side of the front surface, and is provided with a pair of divided bodies that are relatively movable between two positions: a contact position at which end surfaces of the divided bodies that face toward each other are brought into contact with each other, and a separated position at which the divided bodies are spaced apart from each other. The section of the label is folded into the flexed portion with the end surfaces of the divided bodies that face toward each other by relative movement of at least one of the divided bodies, wherein noncontact portions are provided, by eliminating corners, at edge portions of the divided bodies that respectively correspond to the curved portions of the flexed portion on the base end side so as to prevent the noncontact portions from being brought into contact with each other when the end surfaces of the divided bodies are brought into contact with each other.

Accordingly, by folding the section of the label the flexed portion is provided with the end surfaces of the divided bodies that face toward each other by the movement of the divided body by eliminating the corners. The noncontact portions are provided at the edge portions of the divided bodies that respectively correspond to the curved portions of the flexed portion on the base end side so as to prevent the noncontact portions from being brought into contact with each other when the end surfaces of the divided bodies are brought into contact with each other. Therefore, the curved portions are not adhered to each other, and a gap is provided between the curved portions. This increases rigidity, as a cross-section of a base end section of the flexed portion is triangular. As a result, in a state in which the label is applied to the item, the label is often inclined to fall flat at the curved portions depending on an environment in transportation or of a storage area of the item. However, as the rigidity at the base end section of the flexed portion increases, the label becomes less susceptible to falling flat at the curved portions, and this prevents reduced capabilities of wireless reading and writing between the RFID tag and the reader/writer.

Further, as required, the label applicator further includes: a suction-holding plate driving unit configured to move the at least one divided body of the suction-holding plate between the contact position and the separated position; and a control unit configured to control the suction-holding plate driving unit so as to position the divided body of the suction-holding plate at the contact position when the label is suctioned and held, to then move the divided body of the suction-holding plate to the separated position in a state in which the label is being suctioned and held, and to subsequently move the divided body of the suction-holding plate back to the contact position, thereby folding the section of the label into the angled shape with the back surface facing inside and the front surface facing outside. As the suction-holding plate folds the label while the label is being suctioned and held, the label does not easily get out of alignment with respect to the suction-holding plate, and it is possible to reliably provide the flexed portion.

Moreover, as required, the label applicator further includes: a flex assisting unit configured to assist the folding of the section of the label into the angled shape with the back surface facing inside and the front surface facing outside. As the flex assisting unit assists the folding of the section of the label, the section of the label is reliably folded into the angled shape.

Furthermore, as required, the label applicator further includes: a label supply unit configured to transport a strip-shaped backing liner to which the label is temporarily attached, and to separate the label temporarily attached to the strip-shaped backing liner from the strip-shaped backing liner in the transportation and supply of the separated label; and a suction-holding plate moving unit configured to move the suction-holding plate between two positions: a suction-holding position at which the label supplied from the label supply unit is suctioned and held, and an application position at which the suctioned and held label is applied to an item. It is thereby possible to reliably apply the angled label having the flexed portion to the item.

Advantageous Effects of Invention

According to the label applicator of the present invention, the noncontact portions are provided, by eliminating the corners, at the edge portions of the divided bodies that respectively correspond to the curved portions of the flexed portion of the label so as to prevent the noncontact portions from being brought into contact with each other when the end surfaces of the divided bodies are brought into contact with each other. Therefore, the curved portions are not adhered to each other, and a gap is provided between the curved portions. This makes a cross-section of a base end section of the flexed portion triangular, and increases rigidity. As a result, in a state in which the label is applied to the item, the label is often inclined to fall flat at the curved portions depending on an environment in transportation or of a storage area of the item. However, as the rigidity at the base end section of the flexed portion has been increased, the label becomes less susceptible to falling flat at the curved portions, preventing reduction of capabilities of wireless reading and writing between the RFID tag and the reader/writer.

DETAILED DESCRIPTION OF PREFERRED EMBODIMENTS

The following describes a label applicator according to an embodiment of the present invention with reference to the accompanying drawings.

There is a label for which the label applicator according to the embodiment of the present invention illustrated in FIG. 1 to FIG. 4 is intended.

Figure 5:
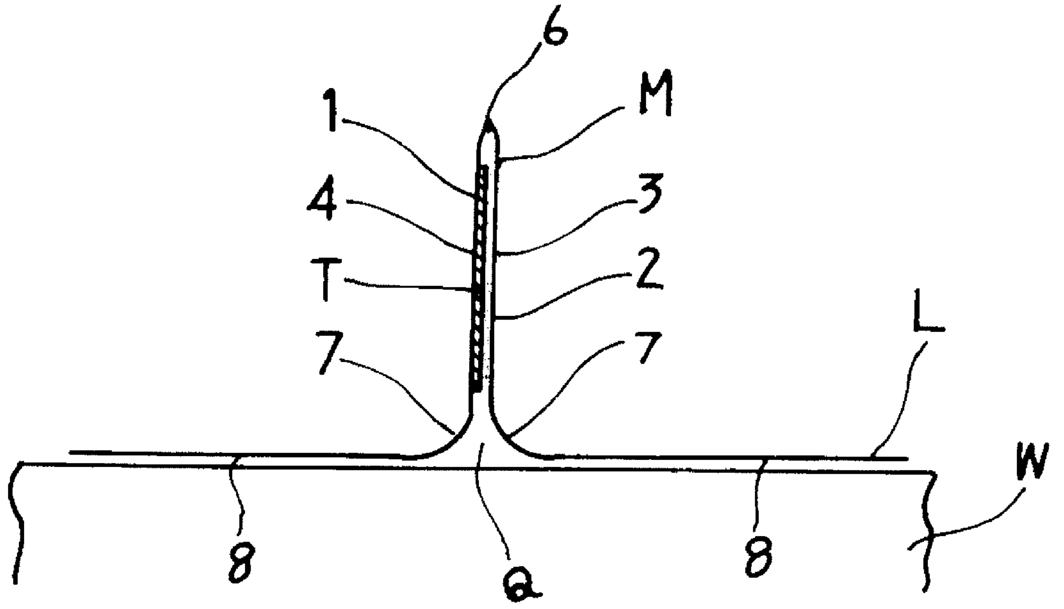
FIG. 5 is a side view illustrating a state of a label applied to an item by the label applicator according to the embodiment of the present invention.
Figure 6:
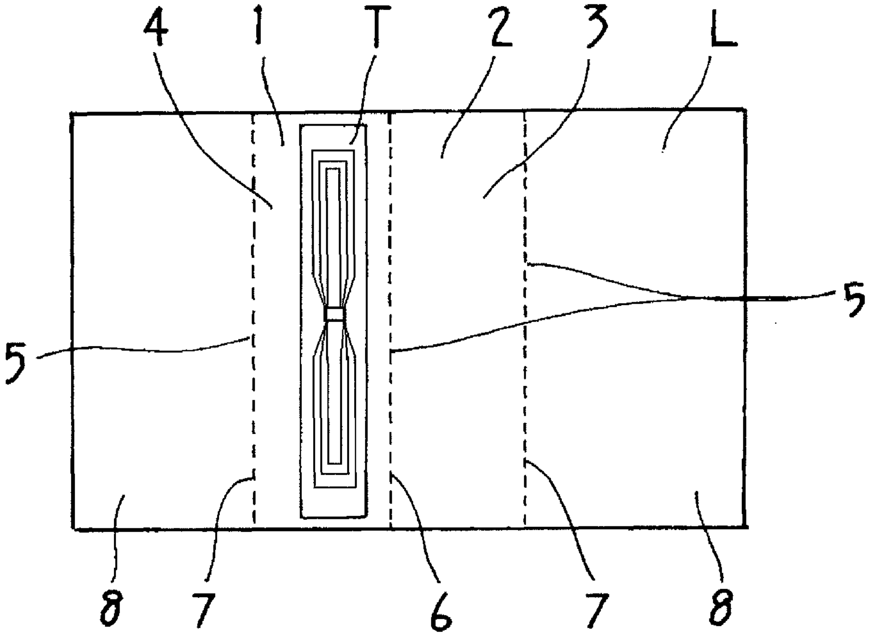
FIGS. 6*a*, 6*b* and 6*c* illustrate one example of the label for which the label applicator according to the present invention is intended.
Figure 6:
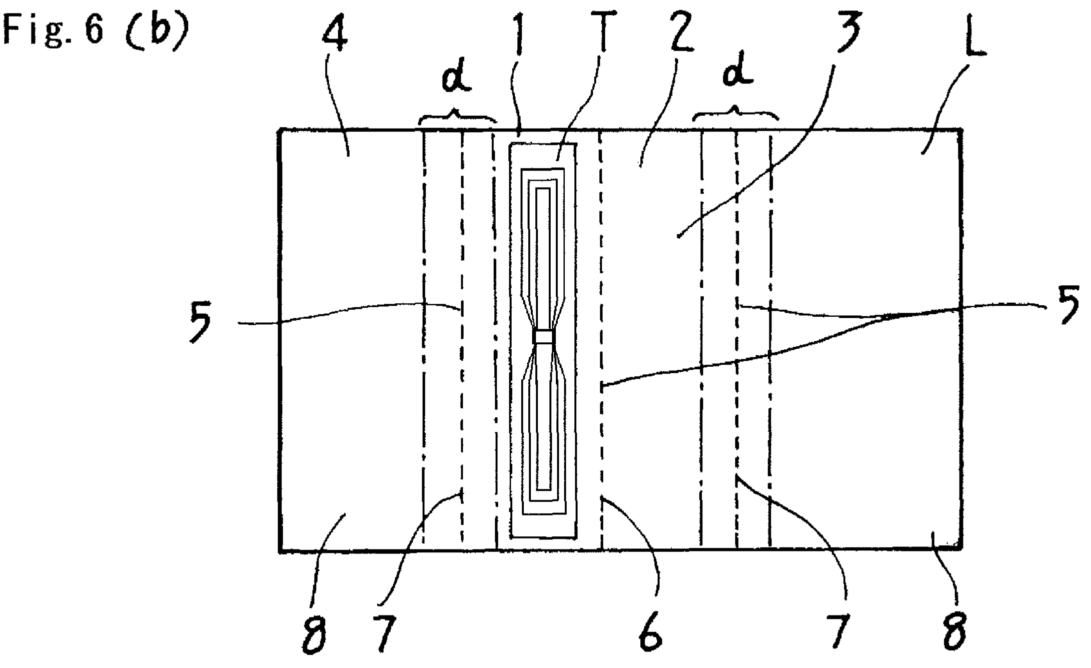
Figure 6:
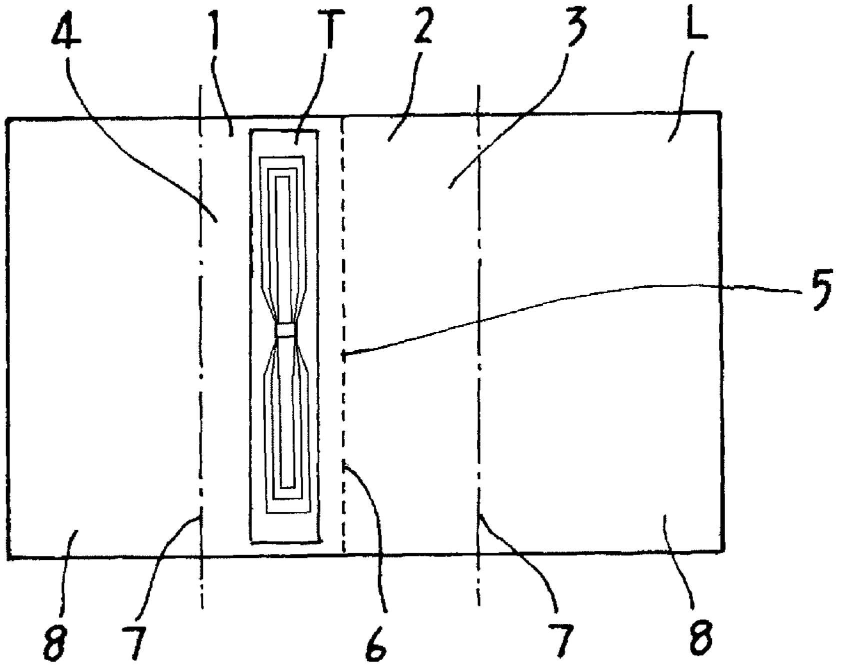
Figure 7:
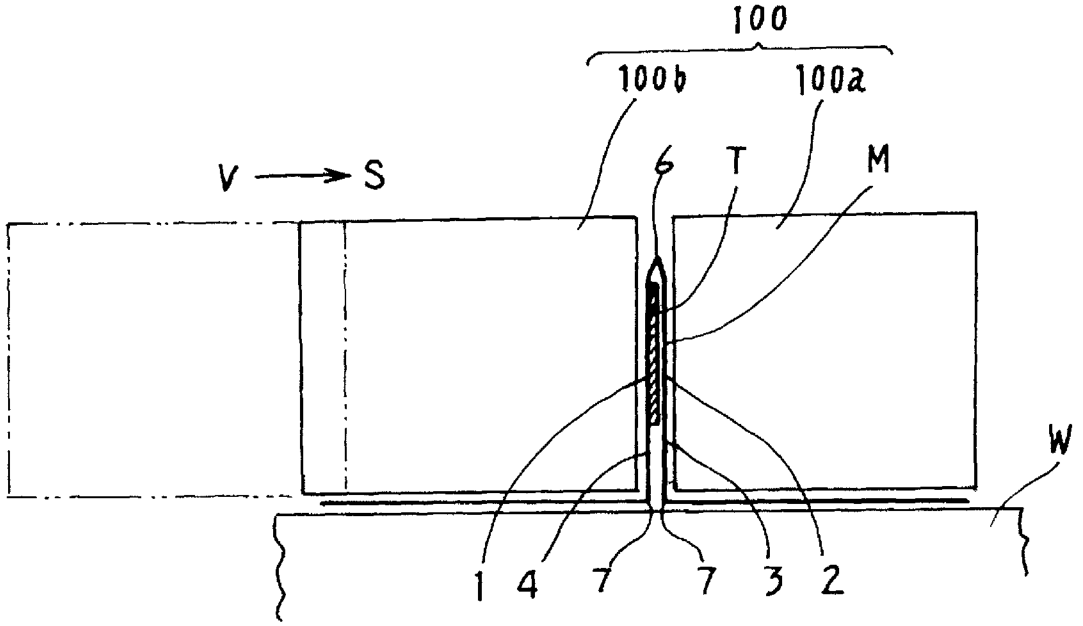
FIG. 7 is a side view illustrating a main portion of a conventional label applicator.

Referring to FIG. 5 and FIG. 6, a label L for which the label applicator is intended is rectangular and is provided with an RFID tag T having an IC chip and a communication antenna. A row of labels L are aligned along a strip-shaped backing liner D (FIG. 2) and are temporarily attached thereto. Labels are individually separated from the strip-shaped backing liner D and are applied to an item W to be labeled. The label L that is applied to the item W is formed into a flexed portion M having one side surface 3 and another side surface 4. Each side surface has a curved portion 7 toward its base end and there is a peak portion 6 as a border between the one side surface 3 and the other side surface 4. The portions 6 and 7 are provided by folding a section 2 of the label L which includes a tag providing portion 1 of the label L at which the RFID tag T is provided so as to all together project into an angled shape. Each side surface includes a back surface (adhesive layer side) facing inside the fold and a front surface (display layer side) facing outside. Further, the tag providing portion 1 constitutes one of either the one side surface 3 or the other side surface 4, wherein the peak portion 6 is the border between the one side surface 3 and the other side surface 4, of the section 2 of the label L projecting into the angled shape (the other side surface 4, in the drawing). Then, when the flexed portion M is formed by folding the section 2 of the label L so as to project into the angled shape with the back surface facing inside, application surfaces 8 of the label L are provided on both sides of the section 2 of the label L.

In the label L shown in FIG. 6(*a*), in the section 2 of the label L that is folded to project into the angled shape, the peak portion 6 of the projecting angled shape and the curved portions 7 are provided with respective rows of perforations 5.

In the label L embodiment shown in FIG. 6(*b*), the peak portion 6 and the curved portions 7 are provided with the perforation 5, and an adhesive is not applied to the back surface within a predetermined range d in a transport direction R centering the perforation 5 of the curved portions 7.

In the label L shown in FIG. 6(*c*), only the peak portion 6 is provided with the row of perforation 5, and the curved portions 7 are not provided with the perforation 5.

However, the configuration of the label is not limited to the above examples, and can be modified as needed. The row of perforations is not necessarily required, and the peak portion 6 and the curved portions 7 can be alternatively provided with folding lines such that the section 2 of the label L can be folded into the angled shape, for example.

Figure 1:
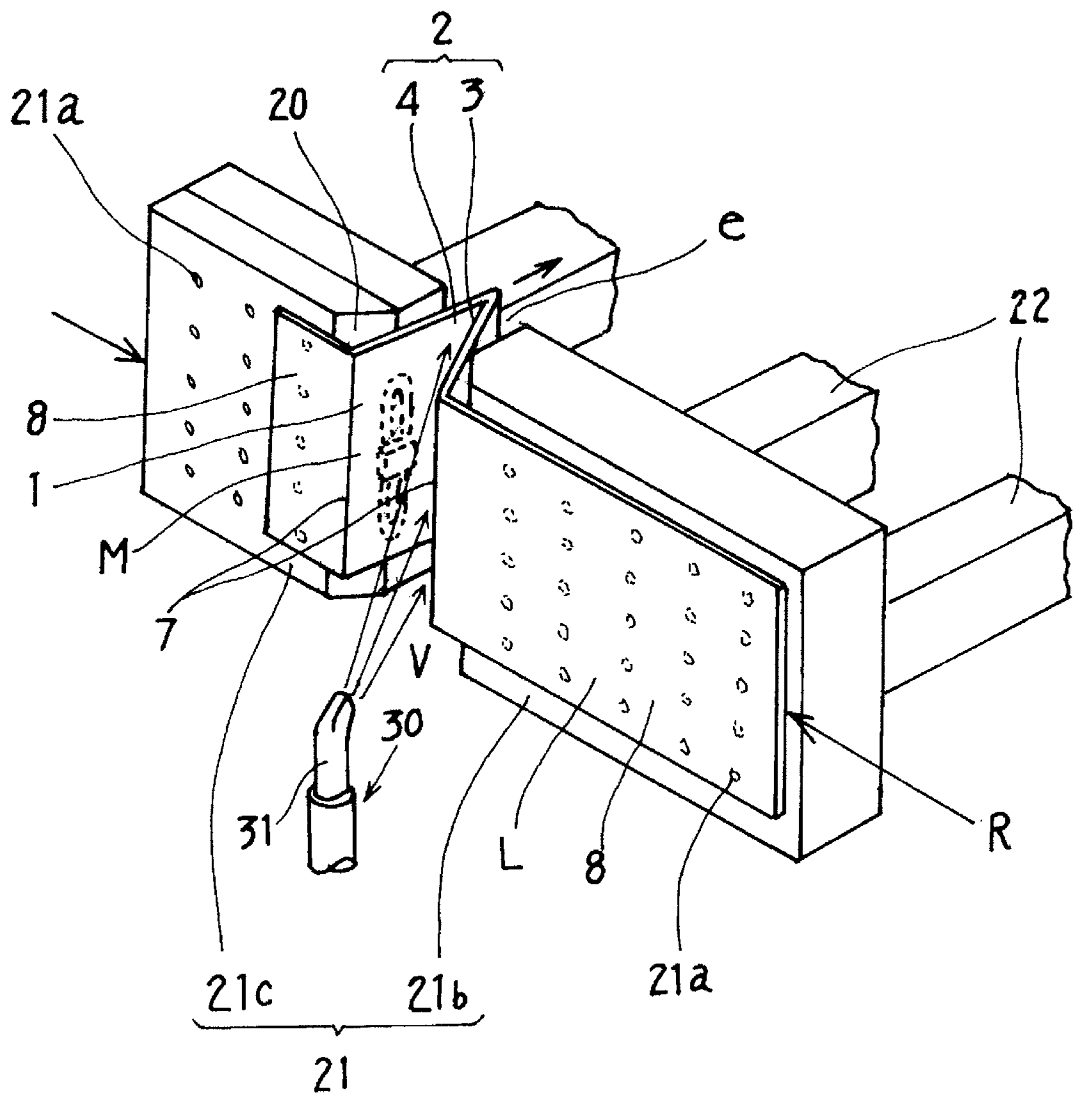
FIG. 1 is a perspective view of a main portion illustrating a label applicator according to an embodiment of the present invention.
Figure 2:
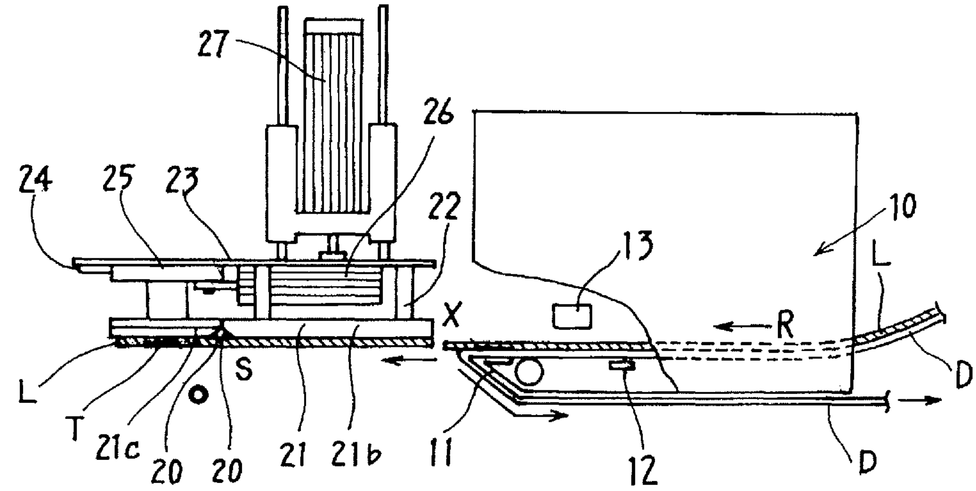
FIGS. 2*a*, 2*b*, 2*c* and 2*d* are side views illustrating the label applicator according to the embodiment of the present invention during successive stages of its operation.
Figure 2:
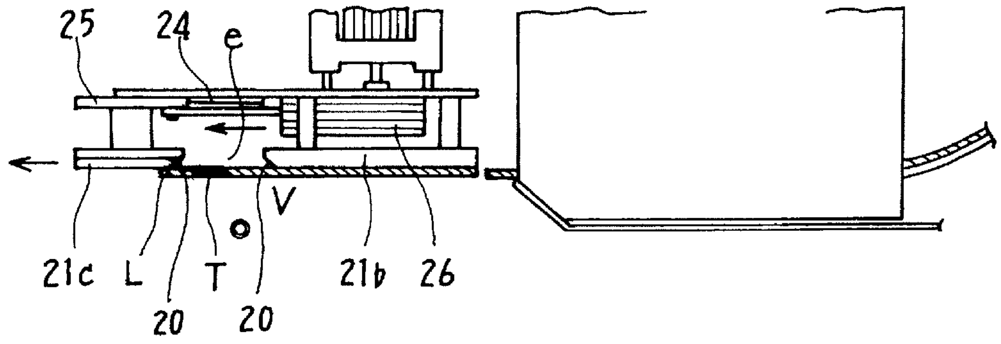
Figure 2:
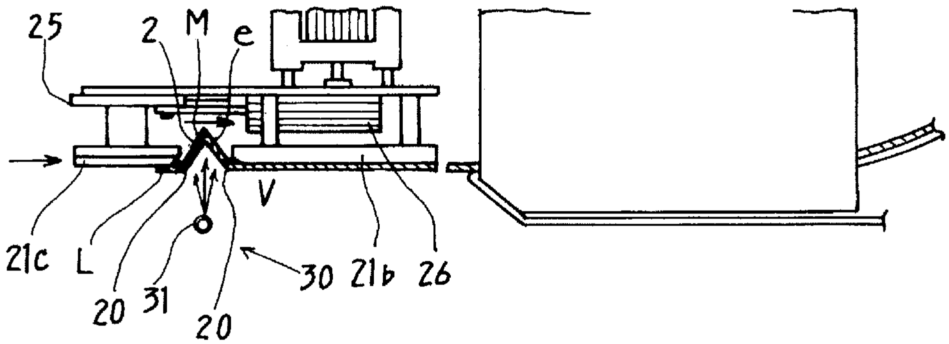
Figure 2:
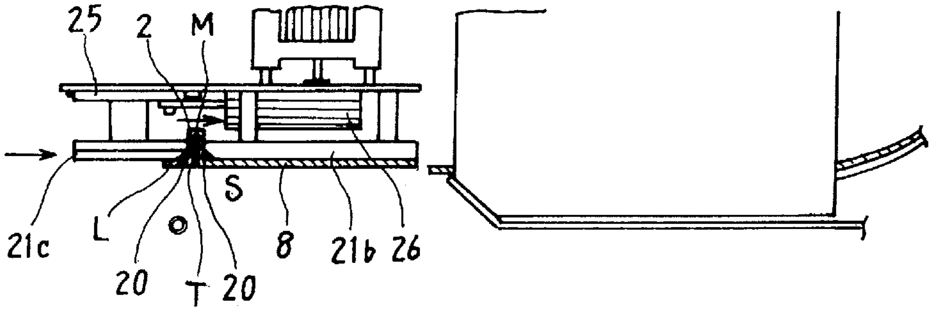
Figure 3:
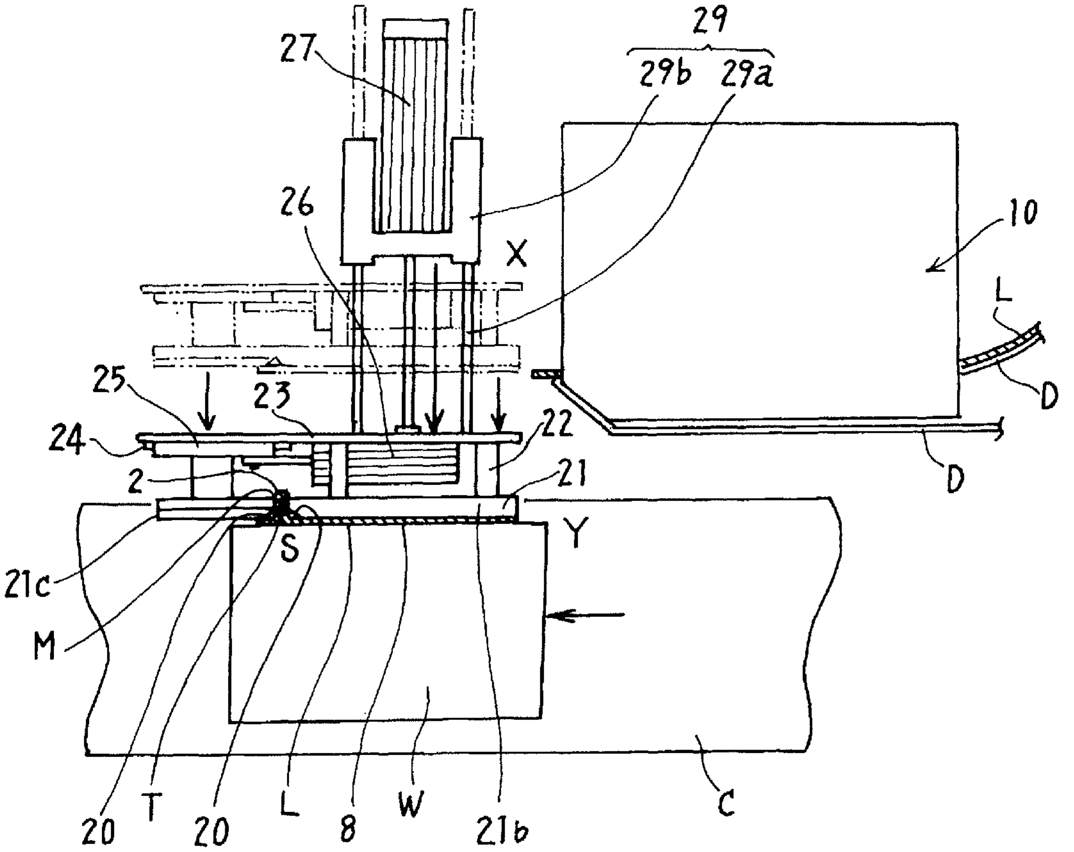
FIG. 3 is a side view illustrating the label applicator according to the embodiment of the present invention along with its operation.

In FIG. 1 to FIG. 4, the label applicator according to the embodiment of the present invention is shown. The label applicator according to this embodiment is provided with a label supply unit 10 that transports the strip-shaped backing liner D to which the label L is temporarily attached, and that separates the label L which is temporarily attached to the strip-shaped backing liner D from the strip-shaped backing liner D during transportation and supplies the separated label L. It includes a suction-holding plate 21 that is moved between two positions: a suction-holding position X at which the label L supplied from the label supply unit 10 is suctioned and held (FIG. 2), and an application position Y at which the suctioned and held label L is applied to the item W (FIG. 3).

The label supply unit 10 transports the strip-shaped backing liner D to which the label L is temporarily attached from a reel that is not depicted, and separates the label L from the strip-shaped backing liner D using a release plate 11 by folding the strip-shaped backing liner D. Referring to FIG. 2, a sensor 12 senses that the label L has been transported to a predetermined position and is used in control by a suction-holding plate driving unit and a suction-holding plate moving unit that will described below. A reader/writer 13 rewrites data to the IC chip of the RFID tag T. After it is folded back, the strip-shaped backing liner D is wound on a reel, not shown.

The suction-holding plate 21 suctions and holds the label L at one a side of the front surface to allow the section 2 of the label L, including the tag providing portion 1 which is provided with the RFID tag T of the label L, and that is separated by the release plate 11, to project with the back surface facing inside. The suction-holding plate 21 is provided with a plurality of small holes 21*a* through which air for suctioning and holding the front surface of the label L is suctioned.

The suction-holding plate 21 is configured of a pair of divided bodies 21*b* and 21*c* that suction and hold the label L. The pair of bodies are provided by dividing the suction-holding plate along a line perpendicular to the transport direction R of the label L. The one divided body 21*b* is supported to a base 23 by a supporting member 22.

The other divided body 21*c* is supported to the base 23 slidably along the transport direction R of the label L by a rail 24 and a slider 25 that slides along the rail 24 and moves between two positions: a contact position S at which a rear end surface of the other divided body 21*c*, in the transport direction R of the label L, is brought into contact with a front end surface of the one divided body 21*b* in the transport direction R of the label L, and a separated position V at which the other divided body 21*c* is positioned apart from the one divided body 21*b*. At the separated position V, a space e is provided between the one divided body 21*b* and the other divided body 21*c*. The section 2 of the label L projects into the space with the back surface facing inside inserted into the space, and the one divided body 21*b* and the other divided body 21*c* respectively suction and hold both end portions of the label L in the transport direction R.

Further, noncontact portions 20 of the divided bodies are provided, by eliminating corners, at edge portions of the divided bodies 21*b* and 21*c* which respectively correspond to the curved portions 7 of the flexed portion M of the label L on the base end side of the label such that the noncontact portions 20 are not brought into contact with each other when the end surfaces of the divided bodies 21*b* and 21*c* are brought into contact with each other.

The applicator is provided with a suction-holding plate driving unit 26 that moves the divided body 21*c* of the suction-holding plate 21 between the two positions of the contact position S and the separated position V. The suction-holding plate driving unit 26 is comprises an air cylinder device that moves the other divided body 21*c* to the contact position S when retracting and to the separated position V when advancing. The suction-holding plate driving unit 26 is comprised of the air cylinder device which includes a piston to which the slider 25 of the other divided body 21*c* is attached and a cylinder that is fixed to the base 23.

The applicator is further provided with a suction-holding plate moving unit 27 that moves the suction-holding plate 21 between the two positions: the suction-holding position X at which the label L that has been separated by the release plate 11 is suctioned and held, and the application position Y at which the suctioned and held label L is applied to the item W. The suction-holding plate moving unit 27 is comprised of an air cylinder device provided with a piston to which the base 23 is attached and a cylinder on a side of a machine base (not shown). In FIG. 3 a guide 29 guides movement of the base 23, which guide is configured by a guiding shaft 29*a* and a guiding pipe 29*b* through which the guiding shaft 29*a* is slidably inserted.

The applicator further comprises a flex assisting unit 30 that assists insertion of the section 2 of the label L which projects with the back surface facing inside between the one divided body 21*b* and the other divided body 21*c*.

The flex assisting unit 30 comprises an air nozzle 31 that blows air at the section 2 of the label L toward a side of the back surface (adhesive layer side), and folds the section 2 of the label L into its angled shape with the back surface facing inside. The flexed portion M has one side surface 3 and the other side surface 4 each having the curved portion 7. The peak portion 6 is at the border between the one side surface 3 and the other side surface 4. It is formed by folding the section 2 of the label L by the air nozzle 31 and the suction-holding plate driving unit 26 constituted by the air cylinder device. This makes it possible to reliably perform the folding.

The applicator is further provided with a control unit that controls the suction-holding plate driving unit 26 and the suction-holding plate moving unit 27 described above. In particular, in controlling the suction-holding plate driving unit 26, the divided body 21*c* of the suction-holding plate 21 is positioned at the contact position S when suctioning and holding the label K, and then the divided body 21*c* of the suction-holding plate 21 is moved to the separated position V while the label L is being suctioned and held. Subsequently, the divided body 21*c* of the suction-holding plate 21 is moved back to the contact position S, thereby folding the section 2 of the label L into the angled shape with the back surface facing inside.

Thus, the application of the label L using the label applicator according to this embodiment is carried out as described below.

As shown in FIG. 2(*a*), when the label L is separated by transporting the label L by the label supply unit 10 and folding back the backing D by the release plate 11, the suction-holding plate 21 suctions and holds the label L at the suction-holding position X.

Then, the suction-holding plate driving unit 26 constituted by the air cylinder device and the flex assisting unit 30 are actuated. Specifically, as shown in FIG. 2(*b*), the suction-holding plate driving unit 26 operates to position the other divided body 21*c* at the separated position V. This provides the space e between the one divided body 21*b* and the other divided body 21*c*, into which space the section 2 of the label L projecting with the back surface (adhesive layer side) facing inside and the front surface (display layer side) facing outside is inserted.

Next, as shown in FIG. 1 and FIG. 2(*c*), the suction-holding plate driving unit 26 operates to move the other divided body 21*c* from the separated position V to the contact position S. Also, at this time, the air nozzle 31 operates to blow air against the back surface (adhesive layer side) of the section 2 of the label L including the tag providing portion 1 provided with the RFID tag T of the label L. The flexed portion M is formed by pressing the one side surface 3 and the other side surface 4 in a direction to which the back surfaces of the one side surface 3 and the other side surface 4 come closer to each other while the one divided body 21*b* and the other divided body 21*c* respectively suction and hold the both end portions of the label L in the transport direction R. In this case, as the section 2 of the label L is pressed toward a side of the front surface (display layer side) by the blowing force of the air from the air nozzle 31, the section 2 of the label L is reliably folded into the angled shape.

Then, as shown in FIG. 2(*d*), when the other divided body 21*c* moves from the separated position V to the contact position S, the end surfaces of the one divided body 21*b* and the other divided body 21*c* that face toward each other are brought into contact with and press the respective front surfaces (display layers) of the one side surface 3 and the other side surface 4 that are the section 2 of the label L. This brings the back surfaces of the one side surface 3 and the other side surface 4 into contact with each other, thereby forming the flexed portion M.

Figure 4:
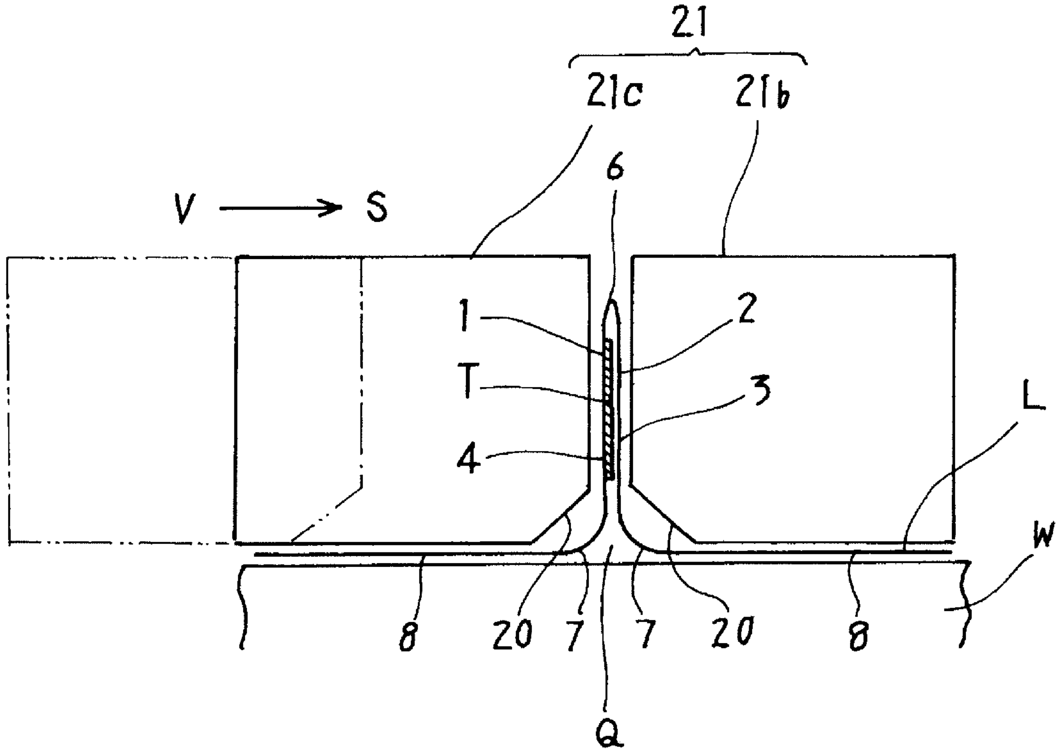
FIG. 4 is a side view illustrating of the main portion of the label applicator showing the operation of the label applicator according to the embodiment of the present invention.

As shown in FIG. 4, the noncontact portions 20 are provided, by eliminating the corners, at the edge portions of the divided bodies 21*b* and 21*c* respectively corresponding to the curved portions 7 of the flexed portion M on the base end side such that the noncontact portions 20 are not brought into contact with each other when the end surfaces of the divided bodies 21*b* and 21*c* are brought into contact with each other. Therefore, the curved portions 7 are not brought into contact with each other and a gap Q is provided between the curved portions 7. This makes a cross-section of a base end section of the flexed portion M triangular, and increases rigidity.

Subsequently, as shown in FIG. 3, the suction-holding plate moving unit 27 comprised of the air cylinder device operates to move the suction-holding plate 21 from the suction-holding position X to the application position Y. With this, the suctioned and held label L is applied to the item W. As the application surface 8 of the label L are provided on the both sides of the flexed portion M that are the section 2 of the label L projecting into the angled shape, the label L is pressed against the item W by the divided body 21*b* and the other divided body 21*c* and is reliably applied to the item W. After the label is applied, the suction-holding plate 21 returns to the suction-holding position X.

As shown in FIG. 5, in the state in which the label L is applied to the item W, the label L is often inclined to fall flat at the curved portions 7 depending on an environment in transportation or of a storage area of the item W as the flexed portion M of the label L is upright. However, the rigidity of the label is increased by the gap Q provided between the curved portions 7 of the flexed portion M and the base end section of the flexed portion M which gap becomes triangular. This makes the label L is not susceptible to falling flat at the curved portions 7, and prevents reduction of capabilities of wireless reading and writing between the RFID tag T and the reader/writer.

In particular, as shown in FIG. 6(*b*), when the label has no adhesive applied to the back surface within the predetermined range in the transport direction R centering the perforation 5 of the curved portions 7, the curved portions 7 are not adhered to each other. Therefore, it is possible to reliably secure the gap Q provided between the curved portions 7 of the flexed portion M, thereby making the label L even less susceptible to falling flat at the curved portions 7.

Further, as shown in FIG. 6(*c*), when the label does not include perforations at the curved portions 7, it is possible to make the label less susceptible to falling flat at the curved portions 7, as the rigidity at the curved portions 7 increases when no perforation is present.

According to the embodiment described above, the flex assisting unit 30 is configured to blow air to the section 2 of the label L from the side of the back surface. However, the present invention is not limited to such an example. It is possible to use a suction nozzle that suctions the section 2 of the label L from the side of the front surface, or to use any type of arrangement as long as it is possible to assist the folding of the section 2 provided with the RFID tag T of the label L in the same direction.

Further, according to the embodiment, the suction-holding plate 21 is moved from the suction-holding position X to the application position Y by the suction-holding plate moving unit 27 comprised of the air cylinder device, thereby pressing and applying the label L to the item W. However, the present invention is not limited to such an example, and it should be appreciated that the present invention can be applied to a label applicator that employs an application method of blowing air from the small holes 21*a* of the suction-holding plate 21 and blasting the label L against the item (air jet method).

Moreover, it should be appreciated that the label applicator according to the embodiment can be implemented as a label applicator provided with printing means having an inkjet head or a thermal head capable of printing variable information, such as information relating to the item W or a barcode, on the front surface of the label L (display layer side).

The invention claimed is:

1. A label applicator that applies a label provided with a tag to an item, the label having first and second side surfaces, each side surface including a front surface and an opposite back surface, and also including a base end at one end of each of the first and second side surfaces, the applicator comprising:

a suction-holding plate configured to suction and hold the label from the front surfaces of the side surfaces, the plate including a pair of divided bodies having opposing end surfaces, the bodies are relatively movable between two positions: a contact position at which end surfaces of the divided bodies that face toward each other are brought toward contact with each other, and a separated position at which the divided bodies are spaced apart from each other, whereby a section of the label is folded into a flexed portion of the label section by the end surfaces of the divided bodies that face toward each other by relative movement of the divided bodies toward the contact position, wherein each body of the pair of divided bodies comprises a noncontact portion including an eliminated corner at an edge portion of the body, and the noncontact portions respectively correspond to curved portions at flexed portions on the base end of the first and second surfaces of the label, the noncontact portions positioned and configured to prevent the noncontact portions of the bodies from being brought into contact with each other when the end surfaces of the divided bodies are brought toward contact with each other, wherein the noncontact portions are positioned and configured such that application of the label carried out by movement of the divided bodies toward the contact position causes folding of a section of the label including a tag providing portion of the label so the folded section projects into an angled shape between the divided bodies with the back surfaces facing inside the angled shape and the front surfaces facing outside the angled shape, thereby forming the flexed portions to include each side surface having a curved portion at the base end of the label, and the folded section in an angled shape defining a peak portion as a border between the one side surface and the other side surface.

2. The label applicator according to claim 1, further comprising:

a suction-holding plate driving unit configured to move at least one of the divided bodies of the suction-holding plate between the contact position and the separated position; and a control unit configured:

to control the suction-holding plate driving unit to position the divided bodies of the suction-holding plate at the contact position when the label is suctioned and held, then to move the divided bodies of the suction-holding plate relatively to the separated position in a state in which the label is being suctioned and held, and subsequently to move the divided bodies of the suction-holding plate relatively back to the contact position, thereby folding the folded section of the label into the angled shape with the back surface of the label facing inside the folded section and the folded side surfaces and the front surface of the label facing outside the folded section and the folded side surfaces.

3. The label applicator according to claim 2, further comprising:

a flex assisting unit configured to assist the folding of the section of the label into the angled shape with the back surface facing inside and the front surface facing outside.

4. The label applicator according to claim 1, further comprising:

a label supply unit configured to transport a strip-shaped backing liner to which the label is temporarily attached, and to separate the label temporarily attached to the strip-shaped backing liner from the strip-shaped backing liner during the transportation and supply of the separated label; and a suction-holding plate moving unit configured to move the suction-holding plate between two positions:

a suction-holding position at which the label supplied from the label supply unit is suctioned and held to the plate, and an application position at which the suctioned and held label is applied to an item.

5. The label applicator according to claim 1, further comprising:

a flex assisting unit configured to assist the folding of the section of the label into the angled shape with the back surface facing inside and the front surface facing outside.

6. The label applicator according to claim 4, further comprising:

a suction-holding plate driving unit configured to move at least one of the divided bodies of the suction-holding plate between the contact position and the separated position; and a control unit configured:

to control the suction-holding plate driving unit to position the divided bodies of the suction-holding plate at the contact position when the label is suctioned and held, then to move the divided bodies of the suction-holding plate relatively to the separated position in a state in which the label is being suctioned and held, and subsequently to move the divided bodies of the suction-holding plate relatively back to the contact position, thereby folding the folded section of the label into the angled shape with the back surface of the label facing inside the folded section and the folded side surfaces and the front surface facing outside the folded section and the folded side surfaces.

7. The label applicator according to claim 1, wherein the tag has an IC chip and a communication antenna.

8. The label applicator according to claim 1, wherein the tag is located on the rear surface facing side of the label.

9. The label applicator according to claim 8, wherein the tag has an IC chip and a communication antenna.

* * * * *